(12) United States Patent
Stewart et al.

(10) Patent No.: US 12,242,828 B2
(45) Date of Patent: Mar. 4, 2025

(54) SOFTWARE COMPILATION FOR NETWORKED PROCESSING SYSTEM

(71) Applicants: Advanced Micro Devices, Inc., Santa Clara, CA (US); ATI Technologies ULC, Markham (CA)

(72) Inventors: Norman Vernon Douglas Stewart, Markham (CA); Mihir Shaileshbhai Doctor, Santa Clara, CA (US); Mingliang Lin, Shanghai (CN)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 86 days.

(21) Appl. No.: 17/978,902

(22) Filed: Nov. 1, 2022

(65) Prior Publication Data

US 2024/0143295 A1 May 2, 2024

(51) Int. Cl.
| | |
|---|---|
| *G06F 9/46* | (2006.01) |
| *G06F 8/41* | (2018.01) |
| *G06F 9/30* | (2018.01) |
| *G06F 9/38* | (2018.01) |
| *G06F 9/48* | (2006.01) |
| *G06F 9/50* | (2006.01) |
| *G06F 9/455* | (2018.01) |
| *G06F 11/14* | (2006.01) |

(52) U.S. Cl.
CPC ............ *G06F 8/41* (2013.01); *G06F 9/5033* (2013.01); *G06F 9/30036* (2013.01); *G06F 9/30065* (2013.01); *G06F 9/30101* (2013.01); *G06F 9/3887* (2013.01); *G06F 9/45558* (2013.01); *G06F 11/1428* (2013.01); *G06F 11/1456* (2013.01); *G06F 11/1469* (2013.01); *G06F 11/1492* (2013.01)

(58) Field of Classification Search
CPC ...... G06F 8/41; G06F 9/5033; G06F 9/30036; G06F 9/3887; G06F 9/30101; G06F 9/30065; G06F 9/45558; G06F 11/1428; G06F 11/1492; G06F 11/1469; G06F 11/1456
See application file for complete search history.

(56) References Cited

U.S. PATENT DOCUMENTS

| | | | |
|---|---|---|---|
| 7,249,351 B1 * | 7/2007 | Songer | G06F 8/451 |
| | | | 717/158 |
| 2008/0244599 A1 * | 10/2008 | Hodson | G06F 9/541 |
| | | | 718/104 |

(Continued)

OTHER PUBLICATIONS

Andrew K. Dickey, Improving APL Performance With Custom Written Auxiliary Processors, 1985, [Retrieved on Oct. 3, 2024]. Retrieved from the internet: <URL: https://dl.acm.org/doi/pdf/10.1145/17701.255348> 6 Pages (114-119) (Year: 1985).*

*Primary Examiner* — Anibal Rivera
(74) *Attorney, Agent, or Firm* — Volpe Koenig

(57) ABSTRACT

A compilation technique is provided. The technique includes including a first instruction into a first executable for a first auxiliary processor, wherein the first instruction specifies execution by the first auxiliary processor; and including a second instruction into the first executable, wherein the second instruction targets resources that have affinity with the first auxiliary processor.

20 Claims, 4 Drawing Sheets

```
600
  │
  ▼
┌─────────────────────────────────────────────────────────────┐
│ Include instructions that explicitly specify an auxiliary    │
│ processor into executable for the auxiliary processor        │
└─────────────────────────────────────────────────────────────┘
                          │
                          ▼ 602
┌─────────────────────────────────────────────────────────────┐
│ Include instructions that target targetable resource having  │
│ affinity with auxiliary processor into the executable for    │
│ the auxiliary processor                                      │
└─────────────────────────────────────────────────────────────┘
                          │
                          ▼ 604
┌─────────────────────────────────────────────────────────────┐
│ Repeat for other executables for other auxiliary processors │
└─────────────────────────────────────────────────────────────┘
                          │
                          ▼ 606
```

(56) References Cited

U.S. PATENT DOCUMENTS

| | | | | |
|---|---|---|---|---|
| 2015/0046679 A1* | 2/2015 | Gathala | ............... | G06F 9/4552 |
| | | | | 712/30 |
| 2019/0347125 A1* | 11/2019 | Sankaran | ............... | G06F 9/383 |
| 2022/0114055 A1* | 4/2022 | Doshi | ............... | G06F 11/1428 |
| 2022/0345417 A1* | 10/2022 | Kasichainula | ...... | H04L 47/2441 |

* cited by examiner

SOFTWARE COMPILATION FOR NETWORKED PROCESSING SYSTEM

BACKGROUND

Networked processing systems often include multiple processors having distinct processing capabilities and connectivity to resources. Compilation techniques for compiling software for such systems are important for facilitating efficient performance.

BRIEF DESCRIPTION OF THE DRAWINGS

A more detailed understanding can be had from the following description, given by way of example in conjunction with the accompanying drawings wherein.

DETAILED DESCRIPTION

A compilation technique is provided. The technique includes including a first instruction into a first executable for a first auxiliary processor, wherein the first instruction specifies execution by the first auxiliary processor; and including a second instruction into the first executable, wherein the second instruction targets resources that have affinity with the first auxiliary processor.

Figure 1:
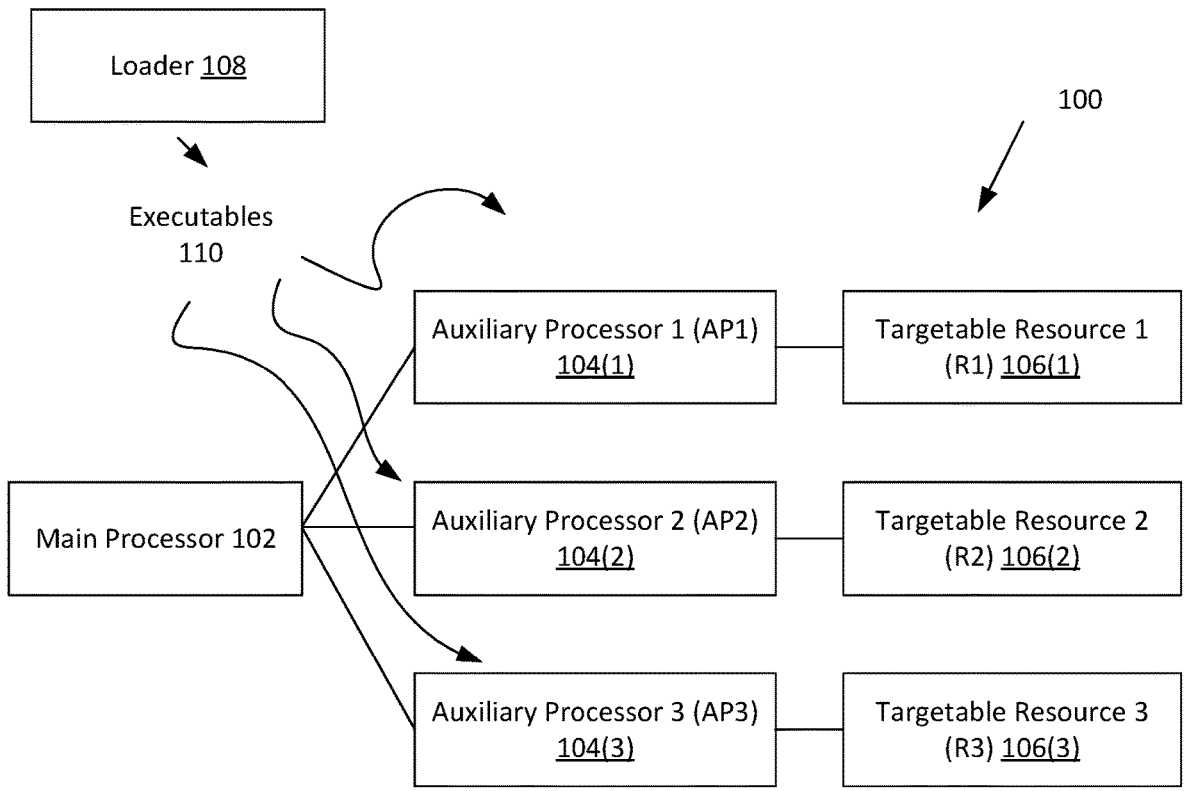
FIG. 1 is a diagram of a system in which aspects of the present disclosure can be implemented.

FIG. 1 is a diagram of a system 100 in which aspects of the present disclosure can be implemented. The system 100 includes a main processor 102 and a plurality of auxiliary processors 104. One or more of the auxiliary processors 104 is associated with a targetable resource 106. The main processor 102 and auxiliary processors 104 include circuitry configured to execute a set of instructions. The main processor 102 is communicatively coupled to the auxiliary processors 104 and the auxiliary processors 104 are communicatively coupled to a set of targetable resources 106. The targetable resources 106 are any computing resources such as memory, hardware accelerators (e.g., hardware circuitry for performing operations at the request of an auxiliary processor), or other computing resources.

As stated, each of the auxiliary processors 104 is configured to execute software to perform functionality associated with the targetable resources 106. In various examples, the functionality includes performing memory operations (e.g., reads, writes, copies, or other similar operations) for the targetable resources 106, or requesting that the targetable resources 106 perform other operations. The main processor 102 is also configured to execute software to perform functionality. In some examples, this software causes the main processor 102 to instruct one or more of the auxiliary processors 104 to perform certain operations.

A loader 108 loads programs into the main processor 102 and auxiliary processor(s) 104 for execution. The loader 108 is implemented as software executing on a processor (e.g., a central processing unit, not shown), hardware circuitry (e.g., circuitry configured to perform the operations of the loader 108), or a combination thereof. In FIG. 1, the loader 108 is shown loading executables 110 into the main processor 102 and auxiliary processors 104.

In some examples, the main processor 102, auxiliary processors 104, and targetable resources 106 are part of a state save system that supports changing power states of a device as described in further detail herein.

Figure 2:
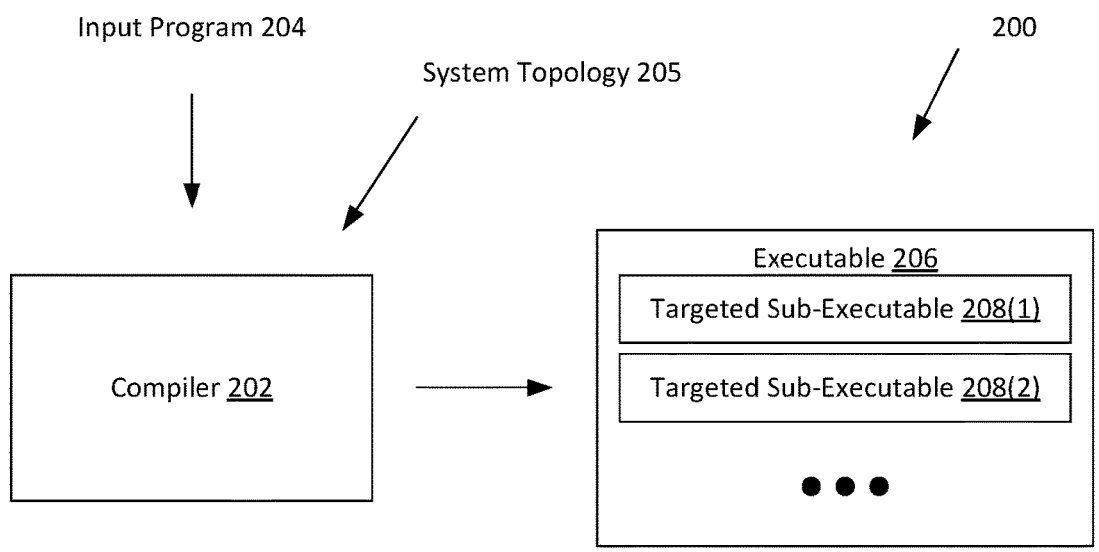
FIG. 2 illustrates a compilation system, according to an example.

FIG. 2 illustrates a compilation system 200, according to an example. The compilation system 200 includes a compiler 202 that processes an input program 204 and generates an executable 206. The input program 204 includes instructions that target the targetable resources 106. For example, for targetable resources that are memory, the instructions read from and/or write to that memory. For targetable resources that are processing units, the instructions command the targetable resources to perform operations. In other implementations, the instructions target the targetable resources 106 in other ways. In various examples, the instructions of the input program 204 can include other operations not disclosed herein.

The auxiliary processors 104 have an affinity for the various targetable resources 106. In various examples, "affinity" means that an auxiliary processor 104 is the "most desirable" auxiliary processor 104 to perform operations for a particular targetable resource 106. In some examples, for targetable resources 106 that are memories, an auxiliary processor 104 that has affinity for that targetable resource 106 is directly coupled to that targetable resource 106, where no other auxiliary processor 104 is directly coupled to that targetable resource 106. In other examples, an auxiliary processor 104 that has affinity to a targetable resource 106 has the lowest latency, highest bandwidth, or both, to that targetable resource 106, out of all of the auxiliary processor 104 (e.g., due to being directly connected).

Instructions of the input program 204 do not necessarily explicitly specify targetable resources 106, and are able to implicitly specify targetable resources 106. In an example, an instruction refers to a memory address that is mapped to a particular targetable resource 106 at runtime. However, the instruction, when written, does not know which specific targetable resource 106 is actually mapped to that memory address.

In addition, the input program 204 is provided to the compiler 202 as a single monolithic program, without instructions split off for execution by the auxiliary processors 104. For example, the input program 204 may include a listing of instructions that involve many different auxiliary processors 204.

For the above reasons, the compiler 202 transforms the input program 204 into an executable 206 which includes multiple targeted sub-executables 208. Each targeted sub-executable 208 is slated to execute on a particular auxiliary processor 104. In addition, except for overridden instructions, each targeted sub-executable 208 includes the instructions from the input program 204 that targets the targetable resource 106 associated with the auxiliary processor 104 that is associated with the targeted sub-executable 208. For example, if the input program 204 includes instructions that write to a memory (targetable resource 106) associated with an auxiliary processor 104, the compiler 202 includes those instructions in the targeted sub-executable 208 for that auxiliary processor 104. In addition, in some examples, other than for overridden instructions, each targeted sub-executable 208 does not include the instructions from the input program 204 that targets targetable resources 106 that do not have affinity with that auxiliary processor 104.

Regarding overridden instructions, in some instances, instructions explicitly specify which auxiliary processor 104 is to perform those instructions. In those instances, even if the instruction specifies a targetable resource 106 that has affinity with a particular auxiliary processor 104, the compiler 202 includes the instruction in the targeted sub-executable 208 for the auxiliary processor 104 specified by the instruction. Put another way, if an instruction explicitly indicates that the instruction should be executed by a particular auxiliary processor 104, but targets a targetable resource that does not have affinity with that auxiliary processor 104, then the compiler 202 includes that instruction in the targeted sub-executable 208 associated with the explicitly indicated auxiliary processor 104.

Figure 3:
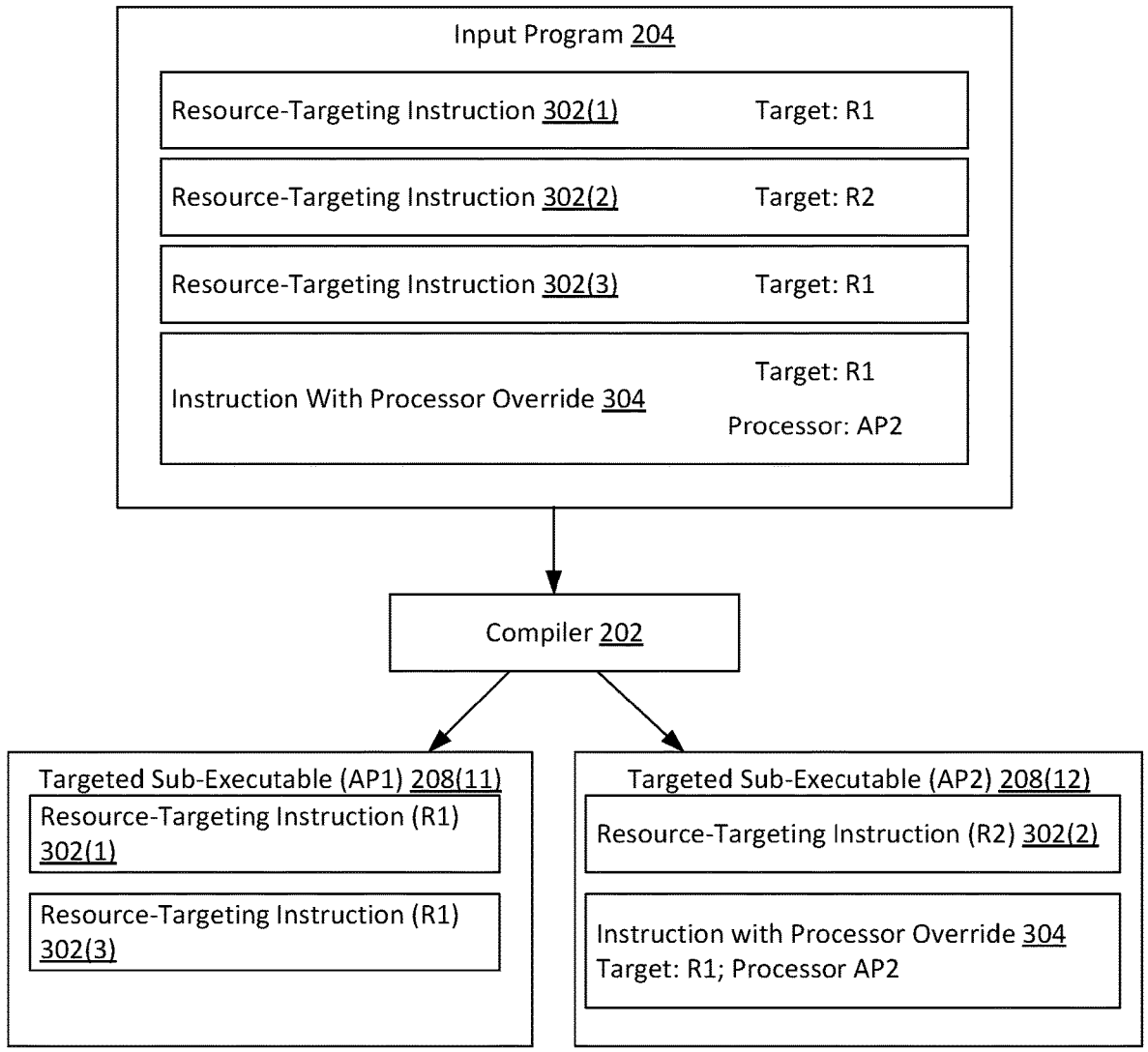
FIG. 3 illustrates an example set of compilation operations.

FIG. 3 illustrates an example set of compilation operations. In this example, the input program 204 includes a set of resource-targeting instructions 302 and an instruction with processor override 304. Each resource-targeting instruction 302 includes a target designation and the instruction with processor override 304 includes a target and an explicit processor designation. It should be understood that the target designation does not need to explicitly name a particular targetable resource 106, but may designate a targetable resource 106 indirectly. For example, the target designation may specify a memory address and the system in which the instructions 302 are executed maps that memory address to a particular targetable resource 106.

The compiler 202 examines the input program 204 and generates targeted sub-executables 208 based on the input program 204. To do this, for instructions that do not include a processor override (e.g., the resource-targeting instructions 302), the compiler 202 includes those instructions into a targeted sub-executable for the auxiliary processor 104 that has affinity with the targetable resource 106 targeted by the instructions. For instructions that have a processor override 304, the compiler 202 includes those instructions into the targeted sub-executable associated with the auxiliary processor 104 that is specified by the instruction 304.

In the example of FIG. 3, the input program includes resource-targeting instruction 302(1), which targets resource R1, resource-targeting instruction 302(2), which targets resource R2, resource-targeting instruction 302(3), which targets resource R1, and instruction with processor override 304, which targets R1 and explicitly specifies processor auxiliary processor 2.

Because the resource-targeting instruction 302(1) and the resource-targeting instruction 302(3) target resource R1, the compiler 202 includes those instructions into the targeted sub-executable 208(11), which is for auxiliary processor 1 (AP1). Because the resource-targeting instruction 302(2) targets R2, the compiler 202 includes that instruction into the targeted sub-executable 208(12), which is for auxiliary processor 2 (AP2). The instruction with processor override 304 targets R1. However, the processor override indicates that the instruction targets processor AP2. Thus, the compiler 202 includes that instruction 304 into the targeted sub-executable 208(12), which is for auxiliary processor 2.

In summary, a compiler 202 compiles an input program 204 for execution on a plurality of auxiliary processors 104. The instructions of the input program 204 do not necessarily explicitly reference any of the auxiliary processors 104. However, the instructions do include implicit or explicit references to targetable resources 106, which can be memory resources, processing resources, or other resources. The implicit references can be references to memory addresses which are mapped to the targetable resources 106, can be explicit references to the targetable resources 106, or can be other implicit or explicit references to the targetable resources 106. For each of a set of auxiliary processors 104, the compiler 202 generates a targeted sub-executable 208, where each such sub-executable 208 includes instructions that will execute on the associated auxiliary processor 104, and does not include any instructions that will execute on other auxiliary processors 104. The compiler 202 determines where each instruction will execute in the following manner. If the instruction includes a processor override, which specifies a specific processor to execute the instruction, then the compiler 202 determines that instruction to execute on the specified processor. If an instruction does not include a processor override, but the instruction includes an implicit or explicit indication of a targetable resource, and the targetable resource is deemed to have affinity with the processor 104 for which the sub-executable 208 is being compiled, then the compiler 202 includes that instruction in the sub-executable 208 for that processor 104.

In some examples, in addition to the instructions that implicitly or explicitly target an associated targetable resource 106, and the instructions that include an override, the compiler 202 includes instructions upon which those instructions depend. Some such instructions include instructions that have a data dependency on included instructions, instructions that included instructions have a data dependency on, or instructions that dictate control flow for otherwise included instructions. For example, the compiler 202 includes instructions from the input program 204 that dictate control flow for otherwise included instructions. The compiler 202 also includes instructions whose data result are data used by included instructions, or instructions that use data generated by included instructions. In some examples, the compiler 202 duplicates instructions from the input program 204 for multiple sub-executables 208 if such instructions are otherwise needed by such multiple sub-executables 208.

In some examples, the compiler 202 receives a system topology 205. The system topology 205 indicates which targetable resources 106 have affinity with which auxiliary processors 104.

In some examples, the compiler 202 is included in a separate computing system than the computing system in which the system 100 is included. For example, a device manufacturer or vendor may execute the compiler 202 to generate the sub-executables 208. The vendor or other party will provide the sub-executables 208 to an end device in which the system 100 is included. In some examples, the sub-executables 208 execute as firmware or another type of software on the auxiliary processors 104. In some examples, the system 100 is included in a computing device such as a laptop, desktop, mobile device, or other type of computing device.

Figure 4:
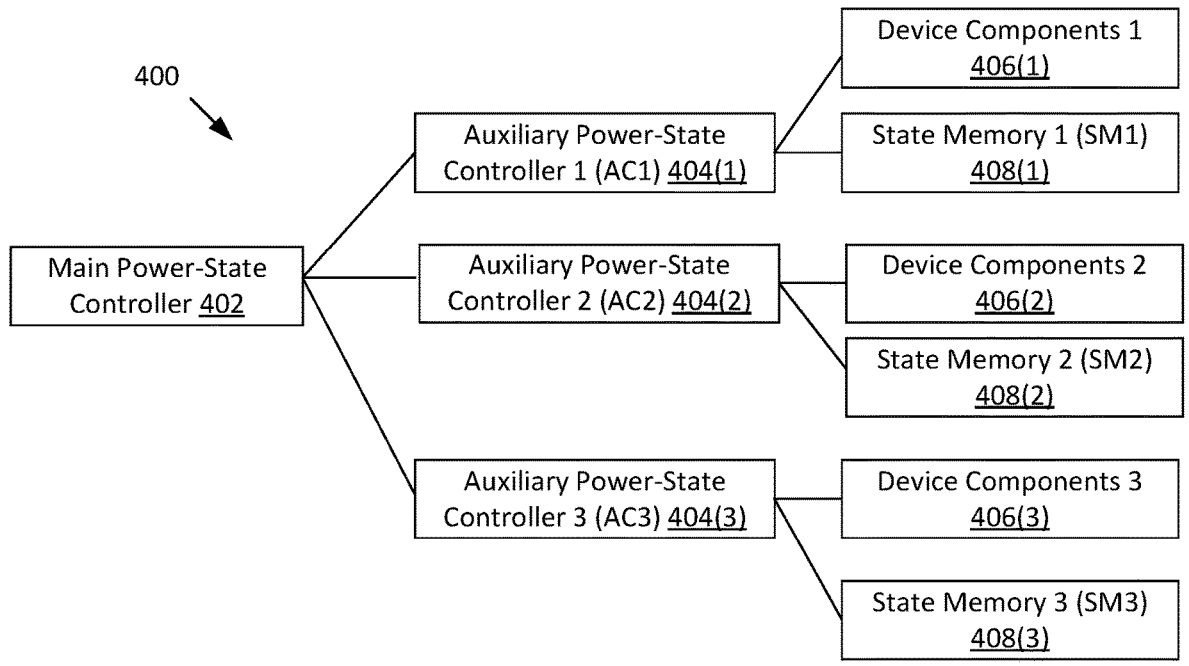
FIG. 4 is a diagram of a power state control system, according to an example.

FIG. 4 is a diagram of a power state control system 400, according to an example. The power state control system 400 includes a main power-state controller 402, auxiliary power-state controllers 404, device components 406, and state memories 408. The power state control system 400 is located within a computing device and controls the power state of the computing device. The components 406 include various components such as a central processing unit, memory, data fabric, hardware accelerators (e.g., graphics processing unit, video encoding or decoding hardware, networking hardware), and/or other components of a computing device.

The power state control system 400 controls the power state of the device components 406. In some examples, controlling power state includes powering the device components 406 on or off. In some examples, when device components 406 are powered off, the state within that device is stored so that, when the device components 406 are later powered on, the device components 406 can be restored to previous working order.

The state within the device components 406 includes data stored in working memory of the device components 406, and/or data otherwise used for operation of the device components 406. Auxiliary power-state controllers 404 are associated with state memories 408 (this association is shown with a line between auxiliary power-state controllers 404 and state memories 408). In some examples, the auxiliary power-state controllers are said to have affinities with these associated state memories 408, due to, for example, having lowest latency to or highest bandwidth to those memories 408, or for another reason. The state memories 408 are configured to store state data of the device components 406. The state memory 408 includes memory that is separately powerable from the device components 406. When the auxiliary power-state controllers 404 save state from the device components 406 into the state memory 408, it is possible to power down the device components 406 while maintaining the state data in the state memories 408. Similarly, when the device components 406 power back up, the auxiliary power-state controllers 404 are able to transfer the state data from the state memories 408 to the device components 406.

Figure 5:
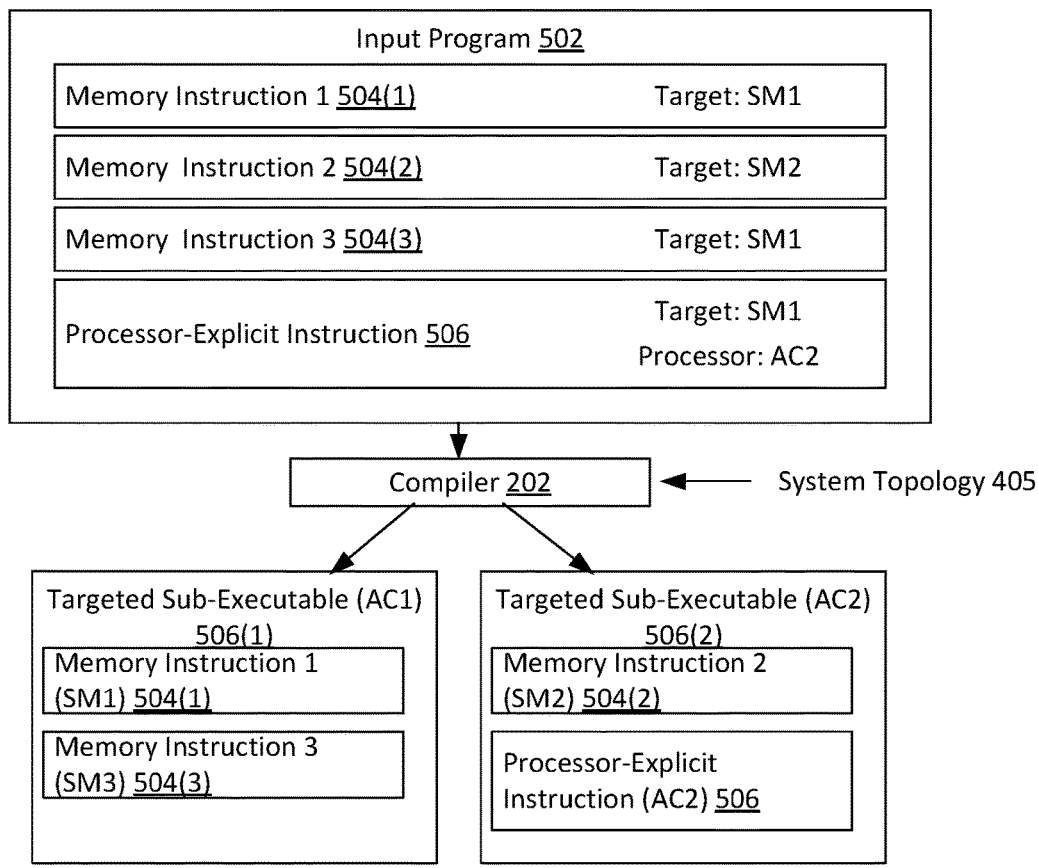
FIG. 5 illustrates a compilation operation for the system of FIG. 4, according to an example.

FIG. 5 illustrates a compilation operation for the system 400 of FIG. 4, according to an example. The input program 502 includes instructions such as memory instructions 504 and process-explicit instructions 506. The memory instructions 504 read from a state memory 408, write to a state memory 408, or copy data between state memories 408. Some memory instructions 504 include instructions to read state from device components 406 and store that state into the state memory 408. Other memory instructions 504 include instructions to write state from state memory 408 to a device component 406. Other memory instructions 504 include instructions to read data from or to memory other than a state memory 408 (e.g., system memory, memory associated with the main power-state controller 402, or other memory).

The processor-explicit instructions 506 can be memory instructions. The processor-explicit instructions 506 include instructions that include an indication of a particular auxiliary power-state controller 404 that is to execute that instruction. In an example, a processor-explicit instruction 506 indicates that a first auxiliary power-state controller 404 should check data stored within a state memory 408 that has affinity with a different auxiliary power-state controller 404. Such check may be for the purpose of determining whether to continue with execution (e.g., whether to wait on a particular condition) or for other reasons.

Referring to FIG. 5, the compiler 202 accepts the system topology 405, which indicates which state memories 408 have affinity to which auxiliary power state controllers 404, and accepts the input program 502, which includes instructions. The compiler 202 generates a set of targeted sub-executables 506 based on the input program 502 and the system topology 405.

The compiler 202 examines the memory instructions 504 that do not have an indication of which processor should execute those instructions and places those instructions into an appropriate targeted sub-executable 506. Specifically, each such instruction includes a target that implicitly (e.g., through memory mapping) or explicitly refers to a particular state memory 408. An implicit reference is, in some examples, a reference to a memory address that is mapped to a particular state memory 408. The compiler 202 assigns each memory instruction 504 to the targeted sub-executable 506 that has affinity with the state memory 408 targeted by the memory instruction 504. For example, if a memory instruction 504 reads data in state memory 2 SM2 408(2), the compiler 202 includes the memory instruction 504 in a targeted sub-executable 506 associated with the auxiliary power-state controller 404 that has affinity with state memory 2 SM2 408(2). In the example of FIG. 4, that auxiliary power-state controller 404 is auxiliary power-state controller 404(2). The compiler 202 also assigns each processor-explicit instruction 506 to the sub-executable 506 that has affinity with the referenced auxiliary power-state controller 404.

In the example input program 502 illustrated in FIG. 5, memory instruction 1 504(1) targets state memory 1 408(1), memory instruction 2 504(2) targets state memory 2 408(2), and memory instruction 3 504(3) targets state memory 1 408(1). Processor-explicit instruction 506 targets state memory 1 408(1) but explicitly references auxiliary power-state controller 2 404(2). A processor-explicit instruction 506 explicitly specifies that a particular processor (e.g., auxiliary power-state controller 2 404(2)) performs an operation targeting memory (e.g., state memory 1 408(1)). In some examples, a processor-explicit instruction 506 includes explicit information that identifies a particular processor to perform a particular operation. This explicit specification is respected even if the memory that is targeted is not considered to have affinity with that processor. In other words, a processor-explicit instruction "overrides" the affinity between processor and memory (e.g., as specified by the system topology 205), and explicitly specifies that a particular processor will perform a particular memory operation for a memory despite that memory having affinity with a different processor.

The compiler 202 includes memory instruction 1 504(1) and memory instruction 3 504(3), which both target state memory 1 (SM1), into the targeted sub-executable for AP1 504(1). The compiler 202 performs this inclusion because these memory instructions 504 target state memory 1 408(1), which has affinity with auxiliary power-state controller 1 404(1), which is the auxiliary power-state controller 404 for the targeted sub-executable 1 506(1).

The compiler 202 includes memory instruction 2 504(2) and processor-explicit instruction 506 into the targeted sub-executable 2 506(2), which is for auxiliary power-state controller 2 404(2). This inclusion is because the memory instruction 2 504(2) targets state memory 408(2) and processor-explicit instruction 506 references auxiliary power-state controller 2 404(2), even though processor-explicit instruction targets state memory 1 408(1).

In sum, the compiler 202 receives an input program 502 and generates a set of targeted sub-executables 506 based on that input program and system topology 405. Each targeted sub-executable 506 is slated for execution on a particular auxiliary power-state controller 404. The power-state controllers 404 perform operations for changing the power states of device components 406, such as saving and restoring state for the device components 406. The input program 502 includes instructions that access (e.g., read from or write to) state memory 408, such as for saving or restoring state of the device components 406. The input program 502 also includes instructions that explicitly specify a particular auxiliary power-state controller 404 to perform an operation. Such instructions can be instructions to read memory that has affinity with a different auxiliary power-state controller

404, such as to check whether an action is complete. In an example, a processor-explicit instruction 506 causes one auxiliary power-state controller 404 to read memory having affinity with a different auxiliary power-state controller 404 to check whether that different auxiliary power-state controller 404 has completed an operation such as saving all state of an associated device component 406. The instruction may allow or prohibit an auxiliary power-state controller 404 from proceeding with subsequent operations until a different auxiliary power-state controller 404 has completed its operations.

Figure 6:
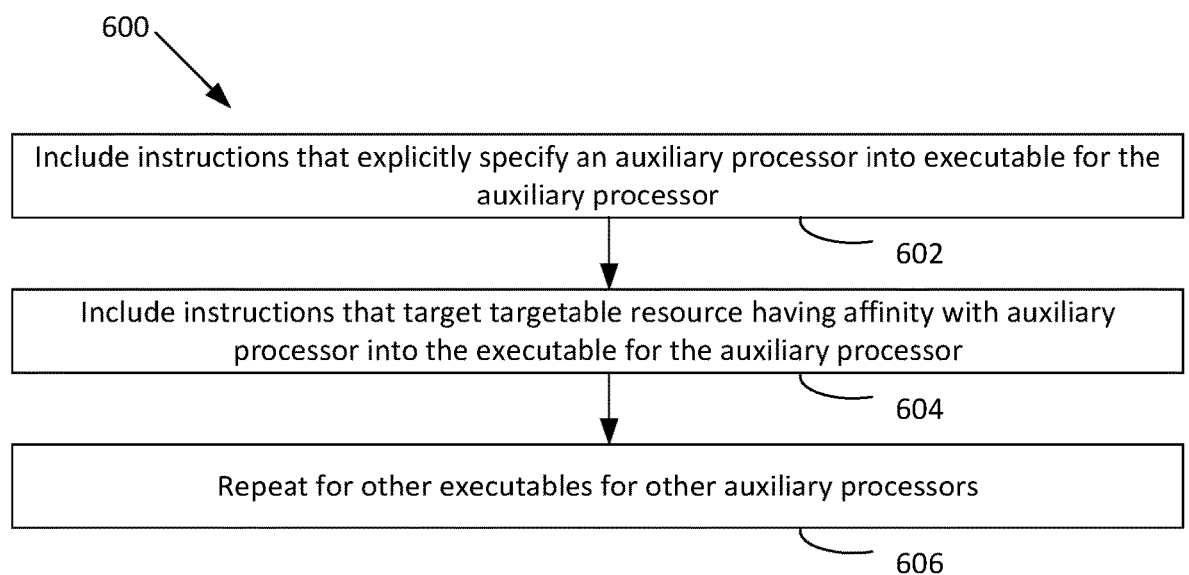
FIG. 6 is a flow diagram of a method for compiling an executable, according to an example.

FIG. 6 is a flow diagram of a method 600 for compiling an executable, according to an example. Although the method 600 is described in the context of the system of FIGS. 1-5, those of skill in the art will recognize that any system configured to perform the steps of the method 600 in any technically feasible order falls within the scope of the present disclosure.

At step 602, a compiler 202 includes instructions that explicitly reference an auxiliary processor into a sub-executable (targeted sub-executable 208 or targeted sub-executable 506) for the auxiliary processor (auxiliary processor 104 or auxiliary power-state controller 404). In various examples, these instructions specify a particular auxiliary processor to perform certain operations such as reading or writing data from a particular targetable resource (targetable resource 106 or state memory 408). The compiler 202 includes these instructions into the sub-executable for that auxiliary processor because that auxiliary processor should execute those instructions.

At step 604, the compiler 202 includes instructions that target targetable resources having an affinity with the auxiliary processor into the sub-executable for that auxiliary processor. These instructions are included into the sub-executable because it is deemed advantageous for instructions that target a particular targetable resource to be executed by a processor with affinity to that resource. In an example, the processor with the lowest latency and/or highest bandwidth to the resource is considered to have affinity to that resource. In some examples, a provided system topology 405 indicates which processors have affinity with which targetable resources.

At step 606, the compiler 202 repeats steps 602 and 604 for other auxiliary processors. For example, the compiler 202 generates additional sub-executables, each for different auxiliary processors, where each sub-executable includes instructions that explicitly specify a particular auxiliary processor or that target targetable resources having affinity with that auxiliary processor.

The elements in the figures are embodied as, where appropriate, software executing on a processor, a fixed-function processor, a programmable processor, or a combination thereof. The main processor 102, auxiliary processor 104, targetable resource 106, main power-state controller 402, auxiliary power state controllers 404, state memory 408, and device components 406 include at least some hardware circuitry and, in some implementations, include software executing on a processor within that component or within another component. The loader 108 may be implemented as hardware (e.g., circuitry), software, or a combination thereof. The compiler 202 is implemented as software executing on a processor.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for compiling, the method comprising:
   in response to a first instruction not including an explicit indication that a first auxiliary processor is to execute the first instruction and targeting a first resource determined based on a system topology at compile-time to be associated with the first auxiliary processor, including the first instruction in a first executable for the first auxiliary processor; and
   in response to a second instruction including an explicit indication that the first auxiliary processor is to execute the second instruction and targeting a second resource determined based on the system topology at compile-time to be associated with a second auxiliary processor, including the second instruction in the first executable for the first auxiliary processor.

2. The method of claim 1, further comprising including third instructions in a second executable for the second auxiliary processor.

3. The method of claim 2, wherein the third instructions specify execution by the second auxiliary processor.

4. The method of claim 2, wherein the third instructions target resources that have affinity with the second auxiliary processor.

5. The method of claim 1, wherein the first auxiliary processor comprises a power-state controller for saving and restoring state from device components.

6. The method of claim 5, wherein the first and second resources comprise save state memory.

7. The method of claim 1, further comprising examining system topology data to determine that the first and second resources have affinity with the first auxiliary processor.

8. The method of claim 1, wherein the first resource comprises memory or processing resources.

9. The method of claim 1, further comprising executing the first executable by loading the first executable into the first auxiliary processor.

10. A system for compiling, the system comprising:
a memory configured to store instructions for a compiler; and
a processor configured to execute the instructions for the compiler, to:
in response to a first instruction not including an explicit indication that a first auxiliary processor is to execute the first instruction and targeting a first resource determined based on a system topology at compile-time to be associated with the first auxiliary processor, include the first instruction in a first executable for the first auxiliary processor; and
in response to a second instruction including an explicit indication that the first auxiliary processor is to execute the second instruction and targeting a second resource determined based on the system topology at compile-time to be associated with a second auxiliary processor, including the second instruction in the first executable for the first auxiliary processor.

11. The system of claim 10, wherein the instructions further cause the processor to include third instructions in a second executable for the second auxiliary processor.

12. The system of claim 11, wherein the third instructions specify execution by the second auxiliary processor.

13. The system of claim 11, wherein the third instructions target resources that have affinity with the second auxiliary processor.

14. The system of claim 10, wherein the first auxiliary processor comprises a power-state controller for saving and restoring state from device components.

15. The system of claim 14, wherein the first and second resources comprise state memory.

16. The system of claim 10, wherein the instructions further cause the processor to examine system topology data to determine that the first and second resources have affinity with the first auxiliary processor.

17. The system of claim 10, wherein the first resource comprises memory or processing resources.

18. The system of claim 10, wherein the memory stores further instructions that cause the processor to execute the first executable by loading the first executable into the first auxiliary processor.

19. A non-transitory computer-readable medium storing instructions that, when executed by a processor, cause the processor to perform operations comprising:
in response to a first instruction not including an explicit indication that a first auxiliary processor is to execute the first instruction and targeting a first resource determined based on a system topology at compile-time to be associated with the first auxiliary processor, including the first instruction in a first executable for the first auxiliary processor; and
in response to a second instruction including an explicit indication that the first auxiliary processor is to execute the second instruction and targeting a second resource determined based on the system topology at compile-time to be associated with a second auxiliary processor, including the second instruction in the first executable for the first auxiliary processor.

20. The non-transitory computer-readable medium of claim 19, wherein the operations further comprise including third instructions in a second executable for the second auxiliary processor.

* * * * *